United States Patent [19]

Chance et al.

[11] Patent Number: 4,547,119
[45] Date of Patent: Oct. 15, 1985

[54] ROBOTIC MANIPULATOR ARM

[75] Inventors: Peter E. Chance, Rosemont; Mitchell Weiss, Ardmore, both of Pa.

[73] Assignee: United States Robots, Inc., King of Prussia, Pa.

[21] Appl. No.: 567,136

[22] Filed: Dec. 30, 1983

Related U.S. Application Data

[63] Continuation of Ser. No. 314,156, Oct. 23, 1981, abandoned.

[51] Int. Cl.⁴ .............................................. B25J 9/00
[52] U.S. Cl. ...................................... 414/735; 901/18; 901/21; 414/718; 414/690
[58] Field of Search ................... 414/4, 5, 7, 690, 718, 414/728, 730, 735, 744; 901/14, 15, 17, 18, 21, 23, 24, 28, 29

[56] References Cited

U.S. PATENT DOCUMENTS

| | | | |
|---|---|---|---|
| 2,933,210 | 4/1960 | Dye | 414/728 X |
| 3,043,448 | 7/1962 | Melton | 901/14 X |
| 3,087,636 | 4/1963 | Weaver | 414/718 |
| 3,836,025 | 9/1974 | Olson et al. | 414/718 X |
| 3,960,285 | 6/1976 | Gano | 414/718 |
| 4,312,622 | 1/1982 | Favareto | 414/730 |

FOREIGN PATENT DOCUMENTS

| | | | |
|---|---|---|---|
| 2630858 | 1/1978 | Fed. Rep. of Germany | 901/21 X |
| 1393349 | 5/1975 | United Kingdom | 901/18 X |
| 2045720 | 11/1980 | United Kingdom | 901/18 X |
| 334777 | 5/1980 | U.S.S.R. | 901/18 X |

OTHER PUBLICATIONS

1982 Robotics Industry Directory, "Maker I Robot System", p. 128.

Primary Examiner—Terrance L. Siemens
Attorney, Agent, or Firm—Caesar, Rivise, Bernstein & Cohen, Ltd.

[57] ABSTRACT

A robotic system including a manipulator arm for moving a device to a predetermined point within a working volume under control of microprocessor based control unit. The manipulator arm includes various sections and joints defining a base, a shoulder, an arm and a wrist. The wrist is jointed to pivot about a pitch axis and a roll axis. The manipulator is arranged to pivot the arm about the base axis and shoulder axis, which axes intersect at a common point. The arm includes a section which is extendable through the use of telescoping links. The wrist is mounted on the end of the telescoping links, with the pitch and roll axes intersecting at a second point. The second point lies along the extension axis of the arm links and is spaced from the shoulder-base axis intersection point. The links forming the telescoping section are arranged to move in unison with each other. A motor and associated harmonic drives are provided to effect the motion at the joints.

30 Claims, 14 Drawing Figures

ROBOTIC MANIPULATOR ARM

This application is a continuation of application Ser. No. 314,156, filed Oct. 23, 1981, now abandoned.

BACKGROUND OF THE INVENTION

This invention relates generally to robotic apparatus, and more particularly, to robotic manipulator arms which are operated to perform a desired series of movements.

Various robot arm systems have been disclosed in the patent literature and are commercially available. Such arms invariably include a tool at their free end for moving the tool to desired spatial positions to effect some task. Prior art arms are frequently jointed or articulated so that the tool can be moved to any position in a three dimensional envelope. This envelope is commonly referred to as the working volume of the arm.

Typical prior art arms which are formed of plural joints with interconnecting sections (sometimes referred to as "links") are those whose joints are arranged so that the links can be moved to simulate movements of a human arm. Hence, robot arms frequently include a "shoulder joint" for rotating the arm about a horizontal axis, a "wrist joint" for rotating the tool holder about a horizontal or pitch axis, a "wrist joint" for rotating the pitched tool holder about an axis, etc. Motors or other actuators, e.g., solenoids, are used to effect the motion of the jointed arm sections. The operation of the motors is usually accomplished under computer control. In this regard, in state of the art systems, the robot arms are controlled by computer means which frequently include microprocessors for effecting movement of the arm to various positions within the working volume in accordance with the predetermined teachable, repeatable program. To accomplish such computer control, the joint motors frequently have associated with them encoders to provide signals indicative of the joint position. These signals are operated on by mathematical computating means in the system's microprocessors so that the exact position of the tool within the working volume is determined to insure accurate arm positioning when the joint motors are operated to move the arm to another position within the working volume.

Heretofore, the geometry of the location of the various joints of prior art robot arms has rendered the calculation of tool position a relatively complicated matter, thereby necessitating powerful processing or computer capacity to effect such calculations.

As will be appreciated by those skilled in the robotic art, the working volume of the arm is a function of the degree of mobility of the joints and the extension of links making up the arm, less the actual volume taken up by the arm itself. Needless to say, it is desirable to maximize the working volume of a robot arm, since an arm with a large working volume permits the performance of a wide range of tasks. Heretofore, prior art robot arms have not provided a sufficiently large working volume for a given size arm.

OBJECTS OF THE INVENTION

Accordingly, it is a general object of the instant invention to overcome the disadvantages of prior art robot arms.

It is another object of the instant invention to provide a robot arm which is compact in size and which provides a high working volume.

It is a further object of the instant invention to provide a robot arm having plural joints for effecting movement of a tool mounted on the arm throughout the working volume, with the axes of said joints intersecting at points to facilitate the computation of tool position within the working volume.

It is a further object of the instant invention to provide a robot arm having four rotary joints and one linear joint, with the linear joint consisting of one stationary and two moving links to result in an arm that is extremely compact, when retracted, yet exhibits a long reach.

It is a further feature of the instant invention to provide a robot arm which is light in weight, yet providing great strength.

It is still a further object of the instant invention to provide a jointed robot arm formed of a modular construction.

It is still a further object of the instant invention to provide a robot arm including plural drives for its various joints and which drives do not require adjustment while in operation.

SUMMARY OF THE INVENTION

These and other objects of the instant invention are achieved by providing a robotic system including a manipulator arm for moving a device to a predetermined point within a working volume under the control of microprocessor based control means. In accordance with one aspect of the invention, the manipulator arm includes joint base means, a first section extending from the joint base means, shoulder joint means, a second section extending along an extension axis from the shoulder joint means and wrist joint means mounted adjacent an end of the second section, said wrist joint means for supporting the device thereon, with the wrist joint means comprising pitch joint means and roll joint means. The base joint means is arranged to pivot the first section through a first predetermined arc about a first axis. The shoulder joint means is arranged to pivot the second section through a second predetermined arc about a second axis. The second axis and the first axis intersect perpendicularly at a first point. The pitch joint means is arranged to pivot the device through a third predetermined arc about a third axis. The roll joint means is arranged to pivot the device through a fourth predetermined arc about a fourth axis. The fourth axis intersects the third axis perpendicularly at a second point. The third axis and the second axis are parallel to each other. The first and second points lie along the extension axis.

In accordance with another aspect of the invention, the manipulator arm includes first joint means, an arm section mounted on the first joint means for rotation through a predetermined arc about a first axis and second joint means mounted on the arm section at a spaced location from the first joint means. The second joint means is arranged to support a device thereon. The arm section comprises first, second and third link means which are telescopically interconnected, whereupon second joint means can be positioned at various predetermined distances from the first joint means.

Other objects and many of the attendant advantages of the instant invention will be readily appreciated as the same becomes better understood by reference to the following detailed description when considered in connection withs the accompanying drawing wherein:

DETAILED DESCRIPTION OF THE PREFERRED EMBODIMENT

Figures 1, 8:
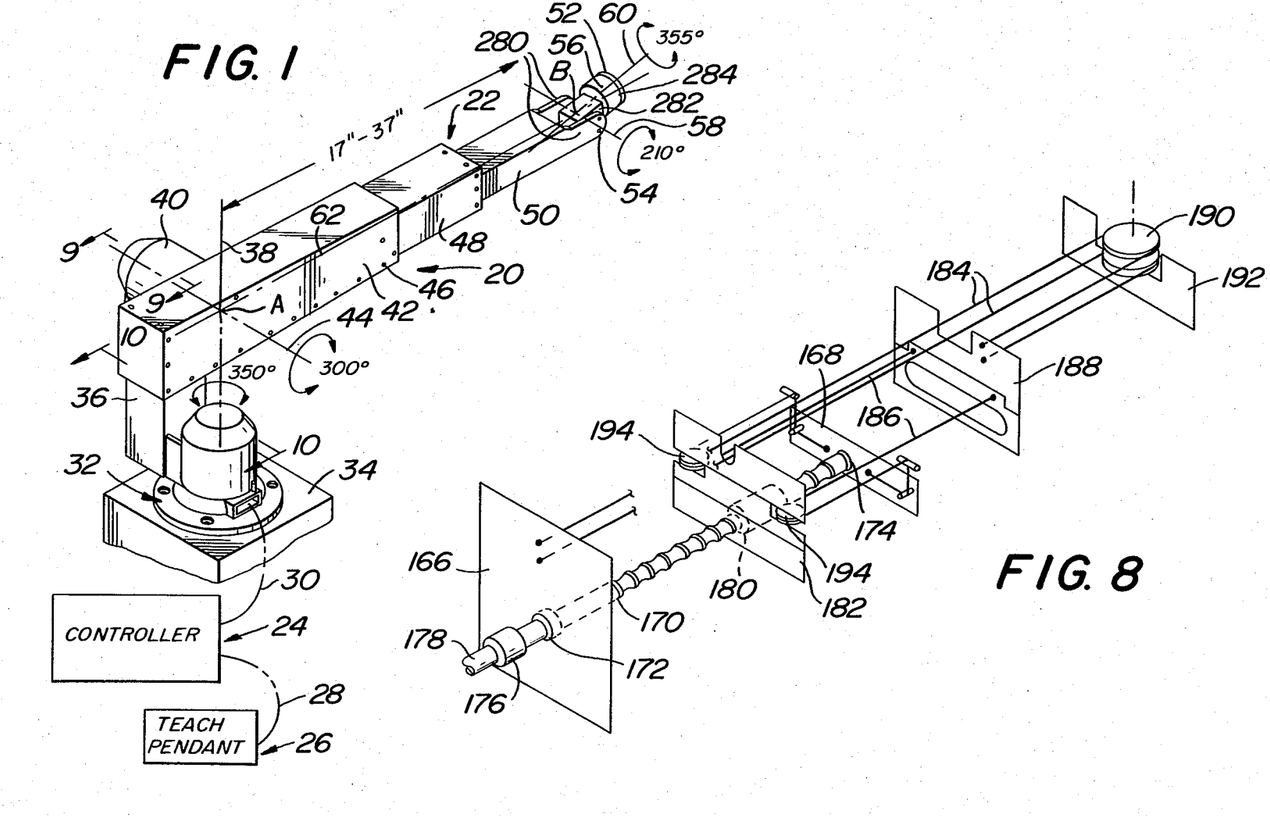
FIG. 1 is a schematic diagram of a robotic system with a perspective view of the robot arm of the system.
FIG. 8 is a schematic perspective view of a portion of the arm shown in FIG. 1 showing the means for effecting linear extension retraction of said arm.

Referring now to the various figures of the drawing wherein like reference characters refer to like parts, there is shown generally at 20 in FIG. 1 a robotic system of the instant invention. The system comprises a robot arm 22, a controller 24 and a teach pendant 26. The arm 22 includes plural joints, to be described later, which are pivotable about respective axes, under the control of associated actuators or motor means, to be described later. Operation of the motors is controlled by separate microprocessors (not shown) in the controller 24.

The robot system 20 is arranged to be operated in what is known as teach-repeat mode. In the teach mode, the arm is taught to perform its desired tasks by leading it through those tasks under operator control. To that end, the teach pendant includes plural switches or keys (not shown) which are arranged to be manually operated to cause the robot arm to move to a desired position in space. This position is then recorded in memory in the controller 24 by the manual operation of other switch means (not shown) at the teach pendant. The arm can then be moved to another position by the suitable operation of the switches of the teach pendant, whereupon the next position is similarly recorded in memory. Accordingly, an entire program of arm movements is recorded in the controller memory for subsequent replay. In the repeat mode, the arm automatically moves to the positions which had been taught. Thus, in the repeat mode, the controller provides signals to the associated actuators in the various joints of the arm to cause the arm to move to those sequential positions previously programmed.

In accordance with the commercial embodiment of the robotic system 20 sold by the assignee of the instant invention, United States Robots, Inc. under the trademark "MAKER", the controller includes a collection of electronic and computer devices, such as microprocessors, which oversee and effect the motions of the arm 22. The teach pendant 26 also contains a microprocessor which interprets the teach pendant switches and which communicates appropriate information to the controller 24, via an intercommunicating cable 28. Information from the controller is also sent back to the teach pendant, via the same cable. Signals to and from the arm 20 are provided by cable 30. The controller 24 includes various microprocessors to effect operation of the arm 22. Such microprocessors are not shown herein, but basically comprise an I/O microprocessor for overall coordination of the operation of the arm, five joint processors (not shown), one for each of the joints forming the arm 22, and a math processor for forming the mathematical calculations and computations attendant in effecting the movement of the arm through the predetermined program. All of the processors are interconnected on a common bus, as shown and claimed in our co-pending U.S. patent application Ser. No. 314,914, filed on Oct. 26, 1981, entitled "Robot Arm Controller With Common Bus Memory", now U.S. Pat. No. 4,467,436, and assigned to the same assignee as the instant invention. By virtue of the common bus memory, the system 20 has wide utility since other processors or devices can be readily incorporated in the system. The common memory enables ready communication between the processors on the common bus.

Also included in the system 20 are means for enabling the direct editing of any program taught to the robot arm by the teach pendant, without necessity of rewriting of the program. To that end, any program can be edited by deleting steps, inserting additional steps or sub-routines in the program, etc.

Referring now generally to FIG. 1, the basic components forming the arm 22 are shown. As can be seen, the arm 22 basically comprises a base 32 which serves as the mount for the manipulator, as well as its first joint. This first joint is referred to as the base or sweep joint. The base 32 is arranged to be mounted on a suitable support structure, such as a pier 34, adjacent a work station (not shown). The next portion of the arm consists of a column 36 which is mounted on the base and arranged to be pivoted through an arc of up to 350° about the vertical axis 38 shown by the broken line in FIG. 1. Thus, the column is arranged to sweep through the arc of 350° by the operation of the sweep joint 32. Mounted at the top of the column 36 is the second joint of the arm, namely, the shoulder joint 40. Attached to the shoulder joint is an extensible arm assembly 42. The shoulder joint is arranged to pivot the arm assembly 42 through an arc of up to 300° about a horizontal axis 44. The arm assembly 42 is in the form of a linearly telescoping joint consisting of links 46, 48 and 50. The links 48 and 50 are arranged to telescope within the link 42 so that the arm can be either extended or retracted. Hence, the third joint of the arm, which is formed of assembly 42, is referred to as the extension joint. At the free end of the extension joint 42 is the "wrist" of the arm. The wrist includes a tool holder 52 at its free end. The tool holder is arranged to support a tool, such as a pneumatic gripper (not shown), for performing the task(s) desired of the robotic system. At the wrist, there are two joints, namely, the wrist pitch joint 54 and wrist roll joint 56. The wrist pitch joint is arranged to pivot the tool holder through an arc of up to 210° about a pitch axis 58. The pitch axis 58 is parallel to the shoulder axis 44. The wrist roll joint 56 is arranged to pivot the tool holder through an arc of up to 355° about a roll axis 60. The roll axis 60 extends perpendicular to the pitch axis 58. The wrist pitch joint 54 forms the fourth joint of the arm, while the wrist roll joint 56 forms the fifth joint.

Each of the five joints has a closed loop servo system associated with it. The servo system includes a DC servo motor and an associated power transmission. In particular, the first, second and fifth joints use harmonic drive reducers, to be described later, whereas the third joint uses a ball bearing screw to generate linear motion and the fourth joint uses a gear set.

Feedback information is provided by an optical shaft encoder, to be described later, associated with each motor. The encoder provides signals through the cables of the arm and interconnecting cable 30 back to the controller 24 so that the controller knows the position of each motor shaft, and hence, the position of the arm's joints.

In accordance with one aspect of this invention and as can be seen in FIG. 1, the base axis 38 and the shoulder axis 44 intersect at a point A, whereas the pitch axis 58 and the roll axis 60 intersect at a point B. The points A and B are located along a common axis 62, whose length is the length of the extension of the link assembly 42, namely, links 46, 48 and 50 making up the extension joint. The shoulder-base intersect point A is referred to as the shoulder intersect point, while the wrist intersect point B is referred to as the wrist intersect point. The axis 62 is referred to as the extension axis.

By using the angles of the base and shoulder joint and the length of the extension axis, as provided by the optical encoders, the math processor in the controller 24 can readily calculate the position of the wrist intersect point B. By using the angles of the wrist pitch joint and the wrist roll joint, compared to the base-shoulder intersect point, the math processor can readily calculate the orientation of the tool holder 52. Thus, for all intents and purposes, the arm 20 effectively looks like a vector in cartesion coordinate space so that the calculation of the position of the tool holder can be accomplished simply through geometric calculations.

In accordance with another aspect of this invention, the arm section 42 is extendable through the telescopeability of the three compact links 46, 48 and 50. This results in an arm which is extremely compact when retracted, yet exhibits a long reach. Thus, the arm takes up only a small volume, while providing a large working volume. This renders the arm particularly suited for operations entailing the assembly of large or small parts or for reaching into small spaces for loading and unloading machine tools.

Figure 10:
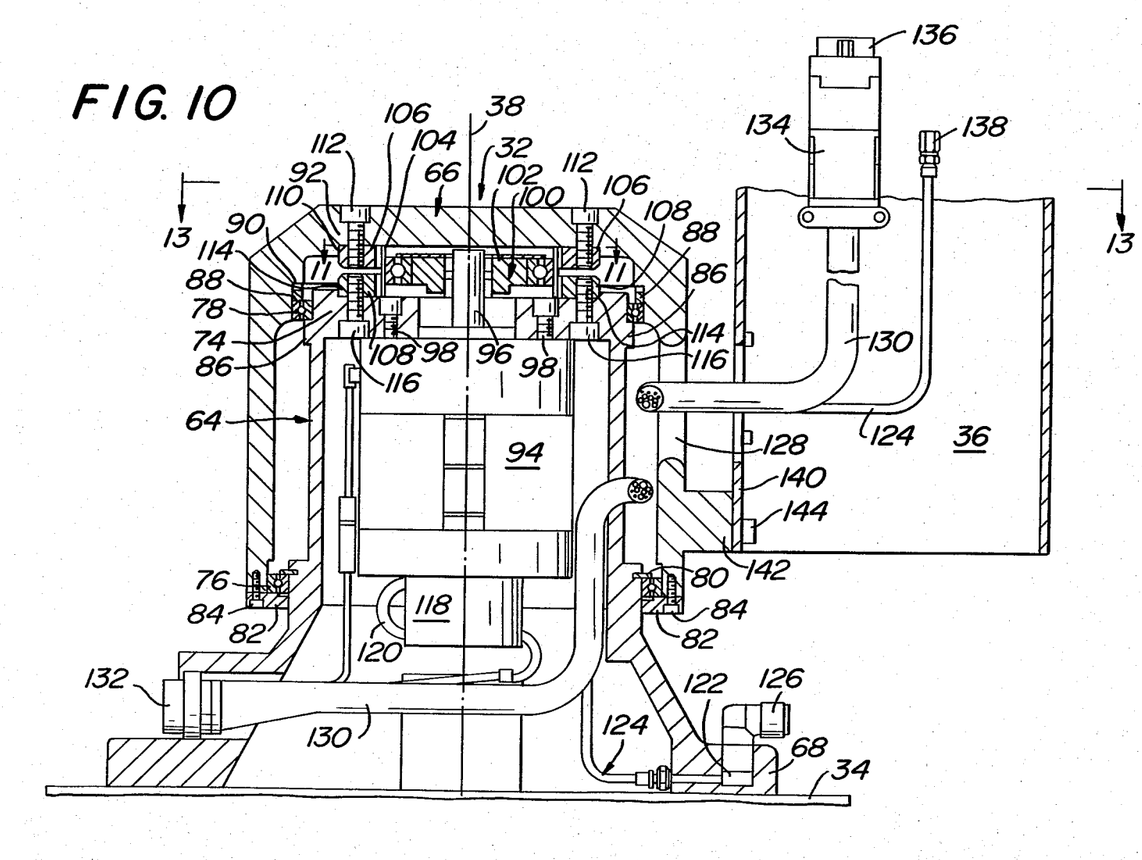
FIG. 10 is an enlarged sectional view taken along line 10—10 of FIG. 1.

The details of the first joint, that is the base joint, will now be considered with reference to FIG. 10. It must be pointed out at this juncture that while the base joint is shown mounted horizontally on a pier 34, it is clear that the arm can be mounted in any orientation on any support structure. For example, the arm can be mounted on a vertical wall, on a horizontal ceiling, etc.

Basically the base joint comprises two components: A base support 64 and a base housing 66. The base support 64 consists of an inverted cup-shaped member having a flange 68, including mounting holes 70 for securement by bolts 72 (FIG. 13) to the pier 34. Disposed over the upper end 74 of the base support is the base housing 66. The base housing is also a cup-shaped member. The base housing is mounted on the base support by a lower bearing assembly 76 and an upper bearing assembly 78 extending between the circular sidewalls forming the base support and base housing. The bearing assemblies are preferably of the angular contact ball bearing type. The lower bearing assembly is held in place about the periphery of the base support by a retaining ring 80 and a retaining plate 82. The retaining plate is secured to the base housing 66 by a plurality of bolts 84. The upper bearing assembly 78 is held in place about the periphery of the base support by a shoulder 86 extending about the periphery of the top 74 of the base support and a spring washer 88 located within an annular recess 90 about the inner periphery of the base housing adjacent the top 92.

The base housing 66 is arranged to be rotated about the vertical sweep axis 38 (FIGS. 1 and 10) under control of the controller 24, via signals provided through cable 30. The actual means for effecting the rotation of the base housing 66 with respect to the base support 64 comprises a DC servo motor 94 mounted within the base support and whose output shaft 96 extends vertically, centered on axis 38. The motor 94 is mounted and held within the base support by a plurality of screws 98 extending through the top plate of the base support.

In accordance with the commercial embodiment of the instant invention, the servo motor 94 for the sweep joint as well as the servo motors for the other joints is a model TO3SP sold by PMI Motors.

The output shaft of the servo motor, which is designated by the reference numeral 96, is connected through rotational speed reduction means, to be described in detail hereinafter, to the base housing 66. The reduction means is coupled to the base housing to reduce the rotational speed of the output shaft of the motor as is coupled to the base housing. Preferably the reduction means comprises a harmonic drive unit 100.

A harmonic drive 100 is a conventional device for reducing rotational speed and increasing torque and is sold by United Shoe Machinery Company, a division of Emhart Industries. One particularly suitable harmonic drive is model EUF25-160.

Figures 9, 11:
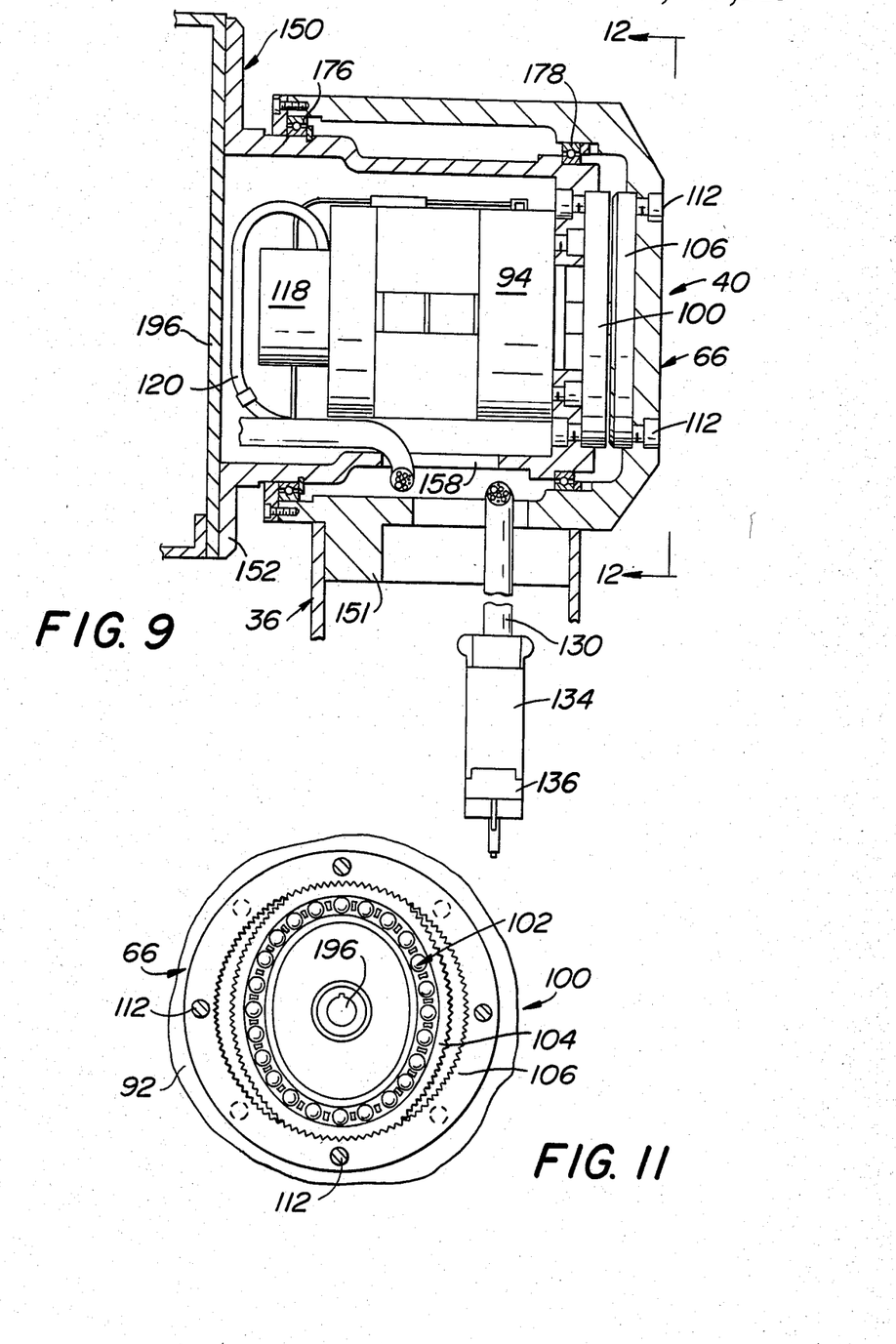
FIG. 9 is an enlarged sectional view taken along 9—9 of FIG. 1.
FIG. 11 is a sectional view taken along lines 11—11 of FIG. 10.

Since the harmonic drive 100 is a conventional, commercially available product, all of its components will not be specifically described herein. Suffice it to state that the drive unit 100 basically comprises the following components which are shown in FIGS. 10 and 11: A wave generator 102, which is fixedly secured to the motor output shaft 96, a flexible spline 104, which fits tightly about the periphery of the wave generator 102 and two rigid splines 106 and 108. The rigid spline 108 is stationarily mounted and is secured in an annular recess 110 in the top 92 of the base support by plural screws 112. The other rigid spline 106, serves as the output of the drive unit 100, and is connected in an annular recess 114 in the inside of the top portion 74 of the base housing by plural screws 116. The harmonic drive unit 100 is arranged so that upon rotation of the output shaft 96 of the motor, the output spline 106 moves relative to the stationary spline 108 in the direction opposite to the direction of rotation of the motor shaft and at a small fraction, e.g., 1/160, of the rotational speed thereof. Thus, the base housing 66 is rotated slowly, e.g., at 1½ radians/second, about the vertical sweep axis 38 upon operation of motor 94.

Also connected to the output shaft of the motor is an optical shaft encoder 118 which provides position signals to the contoller 24, via an electrical cable section 120 in the arm and which is connected to cable 30.

The base support also includes an air port 122 for providing air through pneumatic lines 124 to a pneumatic gripper (not shown) or other pneumatic tool mounted on the mounting plate at the end of the arm. The air port 122 is in the form of a hose fitting 126. The air line or conduit 124 extends through a sidewall in the base support and through an opening 128 in the sidewall of the base housing into the column 36. The electrical cable for the arm, which is denoted by the reference numeral 130, is attached to an electrical connector 132 in the base support. The cable 130 extends through the sidewall of the base support and the opening 128 in the base housing into the column 36. The cable terminates at its upper end in the column 36 in an electrical connector portion 134. The connector portion 134 mates with a second connector portion 136 to which another section of the cable 130 is connected. That latter section of cable extends down the arm from the shoulder.

A pneumatic connector 138 is provided at the end of the air conduit 124 at the top of the column 36 for connection to a corresponding air line connector in the arm at the shoulder. By providing the connectors 134 and 138 within the top of the column 36, the base and the column can be readily disconnected from the remaining portion of the robot arm, thereby expediting servicing, should such become necessary.

Figure 13:
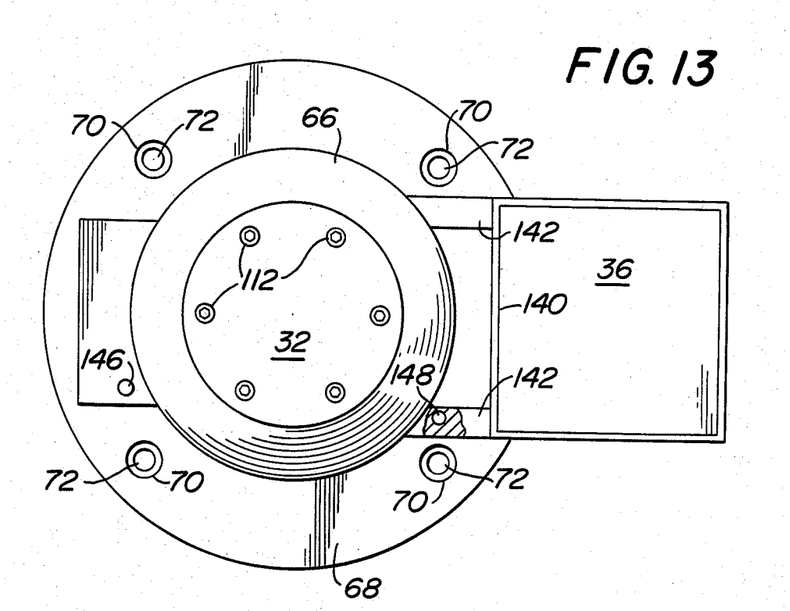
FIG. 13 is a sectional view taken along line 13—13 of FIG. 10.

In FIG. 13, a top view of the base joint and column 36 is shown. As can be seen, the column 36 consists of a hollow square tube having four sidewalls, one of which is identified by the reference numeral 140. The sidewall 140 is secured, via two bosses 142 to the base housing 66 by a plurality of screws 144 (FIG. 10).

The base joint is only permitted to rotate about axis 38 through an arc of 350° as shown in FIG. 1. In order to preclude any overtravel, a pair of stops are provided at the base joint. To that end, one cylindrical, rod-like stop 146 is mounted projecting upward from the flange on the base support and another similarly constructed stop 148 is mounted on the base housing.

The upper end of the arm's column 36 terminates in the shoulder joint 40. The shoulder joint is shown in detail in FIG. 9, and is of the same basic construction as that of the base joint except that in the latter, there is a shoulder support in lieu of the base support of the former. The shoulder support is designated by the reference numeral 150 and is functionally equivalent to the base support but has a differently shaped flange to mount the extensible arm joint 42 on the shoulder. In the interest of simplicity, all of the details of the shoulder joint will not be reiterated. Suffice it to state that the shoulder joint comprises a shoulder base 152, and a shoulder housing 66 mounted on the base, via a pair of bearings 76 and 78. A DC servo motor 94 is mounted within the shoulder support. A harmonic drive unit 100 of the same construction, as described heretofore, is connected to the output shaft of the DC servo motor. The output spline 106 of the drive unit is connected to the shoulder housing. Power to the motor is provided through the electrical cable section 130. An encoder 118 is also mounted on the motor's output shaft.

Figure 12:
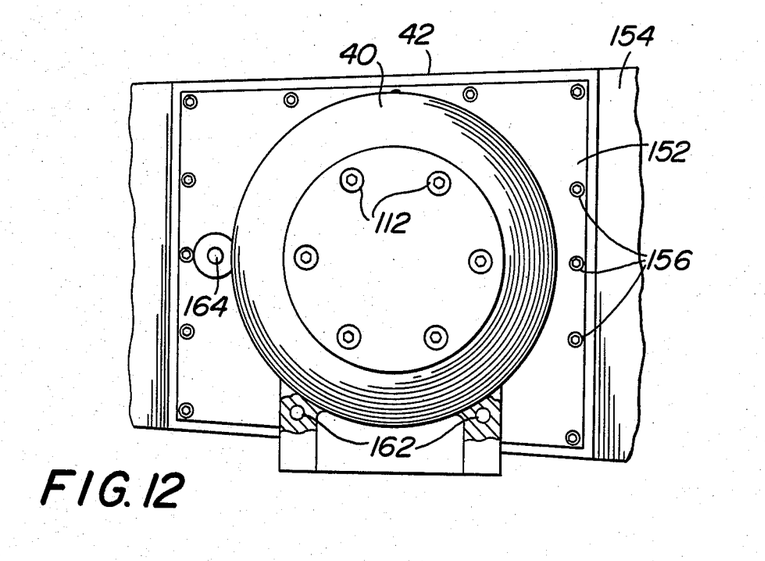
FIG. 12 is a side view taken along line 12—12 of FIG. 9.

The shoulder housing is mounted on the top of the column 36 by a pair of bosses 151. The flange 152 of the shoulder support is secured to the sidewall 154 of the link 42 by plural bolts 156 (FIG. 12). An opening 158 is provided in the sidewall of the shoulder housing and an opening 160 is provided in the sidewall of shoulder support for electrical cables and the conduits of the arm to pass through.

The range of motion of the shoulder joint is 300° about axis 44. In order to insure that there is no overtravel, plural stops are also provided at the shoulder joint. Those stops are shown in FIG. 12 and comprise a pair of rod-like stops 162 mounted on the bosses 151 of the shoulder housing 66 and a similarly shaped stop 164 mounted on the shoulder support flange. Thus, when the shoulder housing is rotated in a clockwise direction, the leftmost boss mounted stop 162 contacts the support mounted stop 164, whereas when the motor is rotated in the opposite direction, the rightmost boss mounted stop contacts the support mounted stop, thereby limiting the travel of the arc of the shoulder to 300° maximum.

Figures 2, 6:
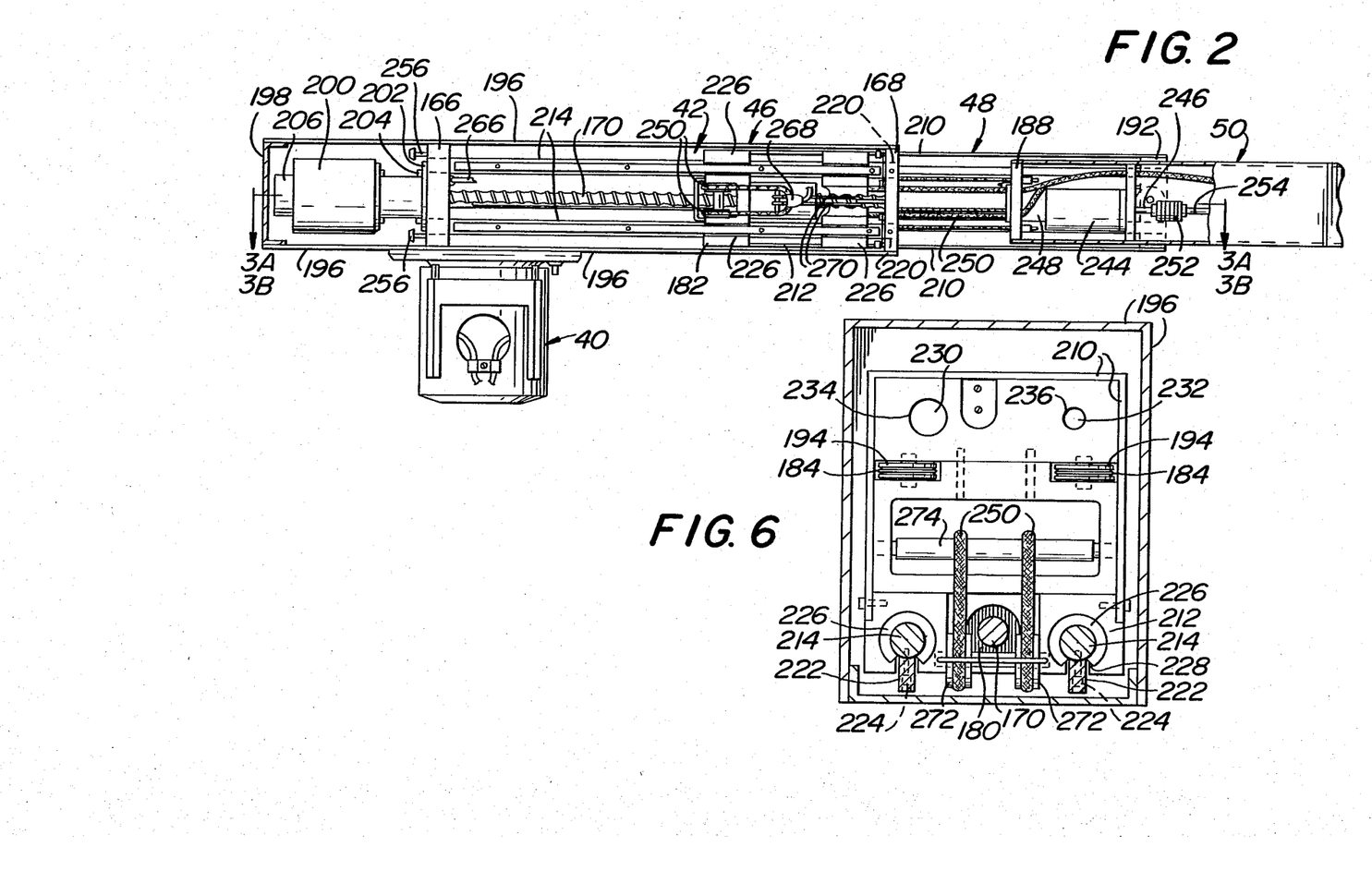
FIG. 2 is a top plan view of the arm shown in FIG. 1, with portions broken away.
FIG. 6 is an enlarged sectional view taken along line 6—6 of FIG. 3A.

Turning now to FIGS. 2 and 8, the basic constructional features of the extension joint, that is the telescoping arm 42, will be described. As noted heretofore, the extension joint consist of three links. Namely, 46, 48 and 50, with links 48 and 50 being telescopeable with respect to link 46. In particular, the links 48 and 50 are arranged to be extended in unison into and out of the link 46 to bring the tool holder to any desired radial position with respect to the vertical sweep axis 38 within the working volume.

In order to expedite the understanding of the telescoping nature and operation of the links 46, 48 and 50, reference will be made to the schematic view of FIG. 8. That view shows the interconnection of the three links making up the extensible arm, with the means for moving the links also being shown. To that end, each link is a tubular member having four elongated sidewalls, a front bulkhead and a rear bulkhead. The front bulkhead is mounted within the interior enclosed by the sidewalls adjacent the front end thereof, while the rear bulkhead is mounted within the interior defined by the sidewalls adjacent the rear end thereof. In FIG. 8, the sidewalls of each of the links are omitted for drawing simplicity and only the bulkheads are shown. As can be seen in FIG. 1, the sidewalls forming link 48 are of lesser width than the sidewalls forming link 46 so that the link 48 can telescope within link 46. In a similar manner, the sidewalls forming link 50 are of smaller width than the corresponding sidewalls of link 48 to enable link 50 to telescope within link 48.

As can be seen in FIG. 8, the link 42 includes a rear bulkhead 166 which is fixedly secured to the sidewalls forming the link at the rear end thereof and a front bulkhead 168 which is fixedly secured to the sidewalls at the front end thereof. An elongated ball screw 170 is mounted within link 42. The rear end of the ball screw is supported within a bearing 172 in the rear bulkhead 166, while the front end of the screw is mounted within the bearing 174 in the front bulkhead 168. The rear end of the ball screw is connected, via a coupling 176, to the rotary output shaft 178 of a DC servo motor (to be described later). A ball nut 180 is mounted on the rear bulkhead 182 of link 48. The front and the rear bulkheads of link 48 are mounted within the sidewalls forming link 48. The ball screw 170 extends through the ball nut. The motor shaft 178 of joint 46 rotates the ball screw in either the clockwise or counter-clockwise direction upon receipt of specific signals from the controller. The rotation of the ball screw causes the ball nut 180 to travel along the screw. Accordingly, since the ball nut 180 is fixedly secured on the rear bulkhead 182 of link 48, the link 48 moves relative to link 42 upon rotation of the ball screw. Thus, when the ball screw is rotated in one rotational direction, the link 48 is pulled within the link 46, whereas when the ball screw is rotated in the opposite direction, the link 48 is extended out of link 46.

As stated heretofore, link 50 is arranged to telescope within link 48 in unison with the telescoping of link 48 with respect to link 46. The means for effecting such unison motion comprises a series of ropes which interconnect links 46, 48 and 50. Such ropes consist of a pair of extension ropes 184 and a pair of retraction ropes 186.

The extension ropes 184 are interconnected between link 46 and link 50. To that end, the rear end of each of the extension ropes is fixedly secured to the rear bulkhead 166 of link 46, while the opposite end of the extension ropes is fixedly secured to the rear bulkhead 188 of link 50. Each of the extension ropes 184 extends about a respective pulley 190 mounted on the front bulkhead 192 of link 48.

As will be appreciated by those skilled in the art, when the ball nut 180 moves along the ball screw 170 in the outward direction, that is toward the tool joint holder, the link 48 is moved outward. Since the rear end of the extension ropes 184 are connected to the back bulkhead 166 of link 46, which link is stationary, the forward movement of link 48 causes the pulleys 190 mounted on the front bulkhead thereof to rotate, thereby pulling on the opposite end of the extension ropes. Since the opposite end of the extension ropes is fixedly secured to the rear bulkhead 188 of link 50, and since that bulkhead is secured to the sidewalls of link 50, link 50 is pulled forward. Thus, it can be appreciated that as link 48 is moved outward by the ball screw and cooperating ball nut, there is a corresponding outward movement of link 50.

The means for effecting the retraction of the links 48 and 50 into link 46 is accomplished, via the retraction ropes 186. As can be seen, the retraction ropes 186 are connected at one end thereof to the rear bulkhead 188 of link 50. The opposite end of the retraction ropes 186 is connected to the front bulkhead 168 of link 46, the stationary link. The retraction ropes extend about respective pulleys 194 mounted on the rear bulkhead 182 of link 48. The extension ropes also extend about pins, to be described in detail later, mounted on the front bulkhead 168 of the link 46. These pins are provided to alter the direction of the retraction ropes and hold the ropes out of the way of other components located within the arm section 42.

As will be appreciated by those skilled in the art, the rotation of the ball screw in the opposite direction from that occurring during the extension operation has the effect of pulling the ball nut toward the rear of the arm, that is away from the tool holder. Since the retraction ropes are mounted at one end to the stationary front bulkhead 168 of link 46, the rearward movement of link 48 with respect thereto causes the pulleys 194 to rotate the pull on the retraction ropes 186. This action pulls on the opposite ends of the retraction ropes, that is the ends connected to the rear bulkhead 188 of link 50, whereupon link 50 moves to the rear in unison with link 48.

Inasmuch as the extension-retraction operation of links 46, 48 and 50 has now been described, reference will be made to the constructional details of the links 46, 48 and 50.

Figure 3A:
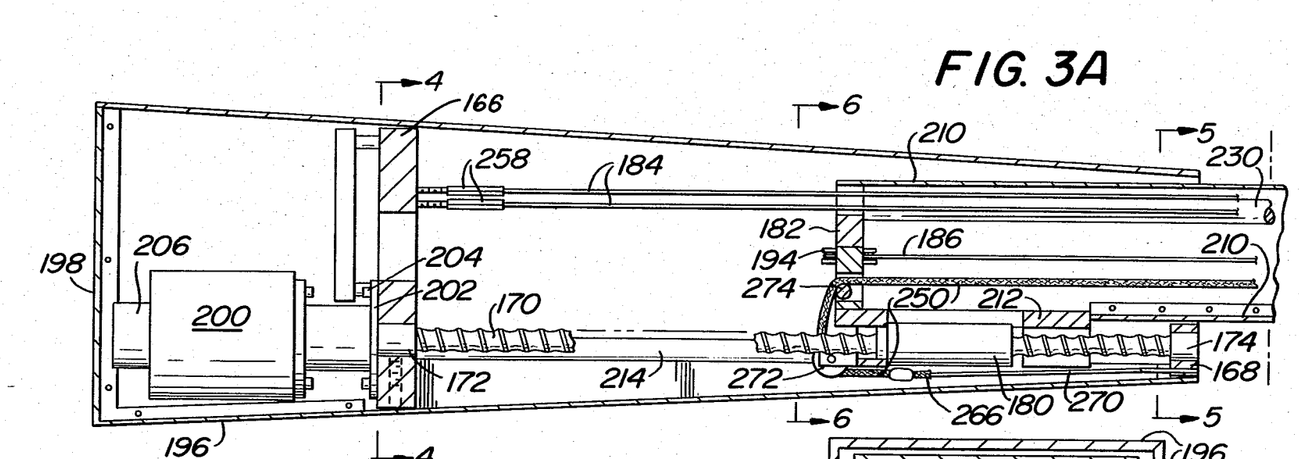
FIG. 3A is one portion of the enlarged sectional view taken along lines 3A, 3B—3A, 3B of FIG. 2.

Accordingly, referring now to FIGS. 2 and 3A, it can be seen that the link 46 consists of a hollow shell formed of plural interconnected sidewalls 196 and an end wall 198. The rear bulkhead 166 is mounted within the interior of the shell of link 46 adjacent the end wall 198. The motor for effecting rotation of the ball screw comprises a DC servo motor 200. That motor is mounted on the back of bulkhead 166 by a mounting flange 202 and associated screws 204. An optical shaft encoder 206 is mounted on the rear of the servo motor housing and is coupled to the motor's output shaft. The output shaft 178 of the motor is connected to the ball screw 170 by the coupling 176.

The heretofore mentioned bearing 172, which is mounted in the rear bulkhead 166 of link 48, actually comprises a pair of ball bearings (not shown) mounted within an opening in the bulkhead.

The link 48, like link 46, also comprises a shell formed of plural sidewalls 210. In the rear end of the shell, the rear bulkhead 182 is mounted. A pillow block 212 is mounted on the bottom sidewall of the link 48 shell at the rear bulkhead. The ball nut 180 is mounted on the pillow block 212. The ball screw 170 extends through the ball nut 180 into the bearing 174 in the forward bulkhead 168 of link 46 and located below the bottom sidewall 210 of the shell of link 48.

Figure 4:
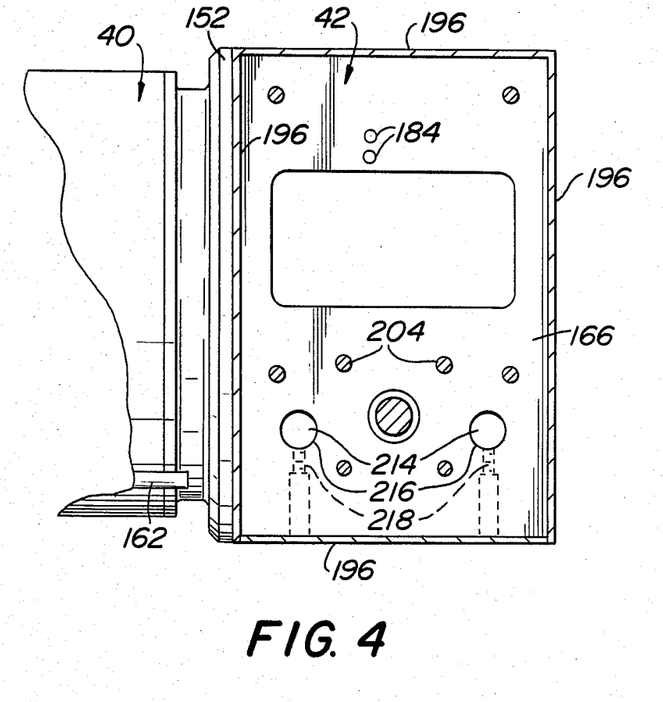
FIG. 4 is an enlarged sectional view taken along line 4—4 of FIG. 3A.

In order to guide the extension and retraction of the link 48 within link 46, a pair of guide rails 214 are provided in the shell of link 46. A second pair of guide rails 215 are provided in the shell of link 48 to guide the extension and retraction of link 50 therein. The guide rails 214 are best seen in FIGS. 2, 3A, 4 and 6. As can be seen, each guide rail is a round, elongated steel rod. The rear end of each rod is fixedly secured within a hole 216 in the rear bulkhead 166 by set screws 218 (FIG. 4). The forward end of each of the rails 214 is mounted within a respective hole 220 (FIG. 5) in the forward bulkhead 168 of link 46. In order to stiffen the guide rails 214 along their length, each guide rail has mounted thereunder an elongated stiffening brace 222 (FIG. 6). Each brace is secured to its associated guide rail, via threaded bolts 224 (FIG. 6).

The means for supporting the link 48 on the guide rails 214 comprises the heretofore mentioned pillow blocks 212 and associated bushings 226. To that end, the guide rails 214 extend through the bushing 226 in the pillow blocks 214. As can be seen in FIG. 6, each bushing 226 includes a slot 228 in the underside thereof to accommodate the rail brace 224.

Figure 5:
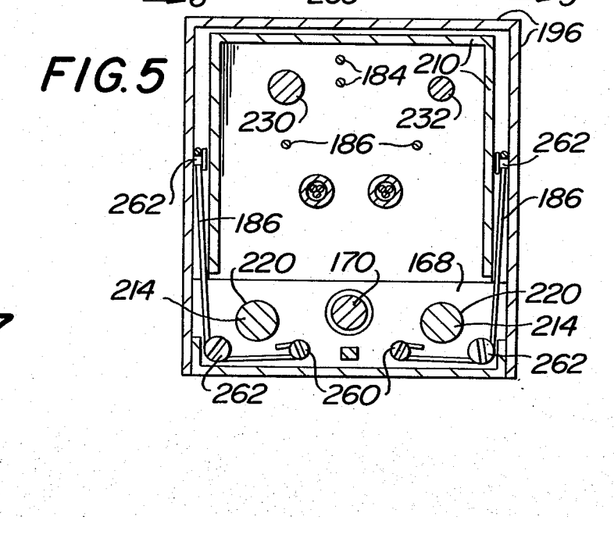
FIG. 5 is an enlarged sectional view taken along line 5—5 of FIG. 3A.
Figure 7:
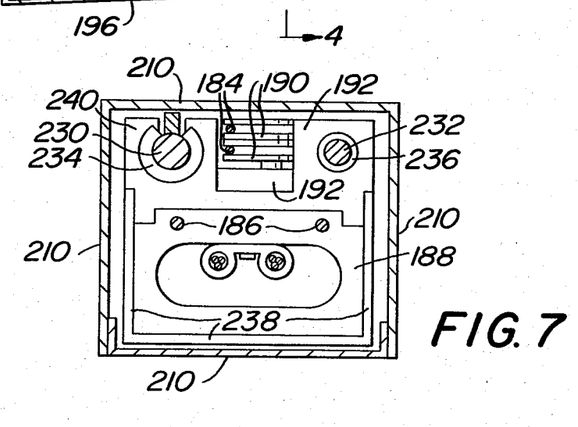
FIG. 7 is an enlarged sectional view taken along line 7—7 of FIG. 3B.

The guide rails 215 for guiding the movement of link 50 within link 48 are each elongated steel rods, with one rail 230 being of larger diameter than the other 232 (see FIG. 5). The rear ends of the guide rails 215 are mounted within respective openings 234 and 236 in the rear bulkhead 182 of link 48 (FIG. 6). The forward ends of the rails 230 and 232 are secured in similar openings, 234 and 236, respectively, in the front bulkhead of link 48 (FIG. 7). The larger diameter guide rail 230 is mounted within link 48 in a similar manner to the mounting of guide rails 214 in link 46, namely, by the use of an elongated stiffening brace. The link 50 is mounted on the guide rails 230 and 232 in a similar manner to the mounting of link 48 on the guide rails 214, namely, the use of pillow block mouted bushings.

Figure 3B:
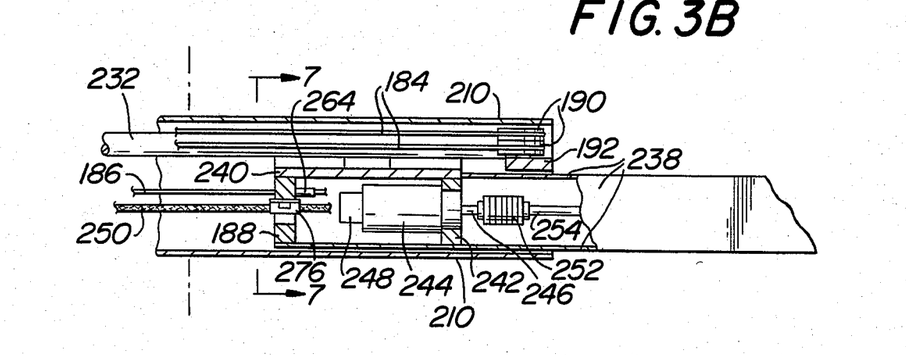
FIG. 3B is the remaining portion of the sectional view taken along line 3A, 3B—3A, 3B of FIG. 2.

Referring now to FIGS. 3B and 7, the details of the construction of link 50 will now be described. As can be seen, link 50 comprises a shell formed of plural, elongated sidewalls 238, which are connected together, and a back wall and which forms the rear bulkhead 188. Mounted on the top wall 238 of link 50 contiguous with the rear bulkhead 188 is a pillow block 240 (FIG. 3B) supporting the bushings through which the guide rails 230 and 232 extend. A mounting plate 242 is fixedly mounted within the sidewalls 238 to the front of the rear bulkhead 188. A DC servo motor 244 is mounted on plate 242 and serves as the means for effecting the rotation of the wrist joint about the pitch axis 58 (FIG. 1). An encoder 250 is mounted on the end of the motor housing 244 and is coupled to its output shaft. The encoder and motor are electrically connected to the remaining portions of the system, via electrical cable sections 250.

The output shaft of the motor is denoted by reference numeral 246 and is connected, via a coupling 252 to an elongated drive shaft 254. The drive shaft 254 extends the length of the link 3 shell for connection to means, to be described generally later, for effecting the pitch rotation of the wrist joint.

A pair of terminal blocks 256 (FIG. 2) are mounted on the rear bulkhead 166 of link 48 and serve as the means for effecting the electrical interconnection between the shoulder and the remainder of the arm, that is links 46, 48 and 50 and the wrist pitch and roll mechanisms.

As can be seen in FIG. 3A, the extension ropes 184 are secured to the rear bulkhead 166, via respective turnbuckles 258. The extension ropes are connected at their opposite ends to the rear bulkhead 188 of link 50 by swaged fittings (not shown). The retraction ropes 186 are secured to the front bulkhead 168 of link 46, via respective anchor screws 260 (FIG. 5). The retraction ropes extend about screw-type guide pins 262 to keep the retraction ropes out of the central portion of the link. The opposite ends of the retraction ropes are connected to the rear bulkhead 188 of link 50 by swaged fittings 264 (FIG. 3B).

In order to insure that during the extension and retraction of the link components making up arm portion 42, the electrical cables located therein are maintained relatively taut and extend over guide means, as will be described hereinafter. To that end, the electrical cable for carrying the electrical signals and power to the remaining portions of the arm from the shoulder are in the form of a cable section 266 secured to the rear bulkhead and in electrical communication with the connections at the terminal blocks 256. The cable section 266 extends up to a "Y" connection or joint 268. The pair of cable sections 250 form the legs of the "Y" connection, with cable section 266 forming the base of the Y. The Y connection 268 is held in place with respect to link 46 by a pair of hook wires swaged to the forward bulkhead 168 of link 46. The pair of cable sections 250 extend about respective guide pulleys 272 mounted on the rear bulkhead 182 of link 48 at the pillow block 212. Each cable section 250 also bends about a horizontally disposed guide roller 274 located in an opening in the rear bulkhead 182 of link 48 to extend to the rear bulkhead 188 of link 50. The cable sections are connected to bulkhead 188, via anchors 276 (FIG. 3B). The cable sections 250 provide the electrical connections for the motor 244 and encoder 248, as well as the other electrical components mounted at the wrist of the arm.

It should thus be appreciated since the cable section 50 is maintained relatively taut between the rear bulkhead 188 of link 50 and the fixed Y connection point adjacent the forward bulkhead 168 of the link 46, no impediment to free extension or retraction of the links is produced by the cables.

The wrist joint of the arm, as noted heretofore, is arranged to pivot about the pitch axis 58. The means for effecting pivoting of the joint about the pitch axis will be described hereinafter. To that end, as can be seen in FIG. 1, the forward end of link 50 is in the form of a yoke having an opposed pair of extending legs 280. The legs 280 form the stationary portion of the wrist pitch joint 54. The movable portion of the wrist's pitch joint comprises a housing box 282. The housing box 282 is mounted on the yoke legs by pivoting means (not shown) and is arranged to pivot about axis 58. The means for effecting pivoting of the box 282 about axis 58 comprises a drive chain, not shown) and associated sprocket (not shown) mounted within one leg 280 of the yoke. The sprocket is mounted on a drive shaft (not shown) fixedly secured to the housing box 282. The drive chain is rotated, via a gear reducer train (not shown) and mounted adjacent the yoke by the end of the elongated drive shaft 252 extending down link 50. Accordingly, upon rotation of the drive shaft 252 under the control of motor 244, the housing box 282 is pivoted about axis 58 through a maximum arc of 210°.

At the forward end of the housing box 282 is another housing 284. The housing 284 serves as one portion of the fifth joint, that is the wrist roll joint. To that end, the housing 284 is stationarily secured to the front end of housing box 282. Located within the housing 284 is a DC servo motor and harmonic drive unit, constructed similarly to the motor's harmonic drives forming the shoulder and base 40 and 32, respectively. The output spline of the harmonic drive unit is fixedly secured to the tool mounting plate 52. The tool mounting plate 52 is arranged to receive a conventional gripper or any tool desired to be manipulated by the arm 20. The pneumatic power for the tool is provided, via the heretofore identifed pneumatic lines. Respective encoders (not shown) are associated with the wrist roll joint and the wrist pitch joint and are coupled, via the electrical cables back to the controller. The electrical signals provided to the harmonic drive within the housing 284 also provided, via the electrical cables.

Upon operation of the DC servo motor within housing 284, the tool mounting plate 52 is enabled to be rotated through a maximum arc of 355° about the roll axis 60.

As will be appreciated from the foregoing, the robot arm of the instant invention, due to the arrangement of its component joints and their intersecting axes, enables the calculation of the position of the tool to be readily calculated by the microprocessor means in the controller. Moreover, the compactness and light weight of the arm coupled with its wide extensibility range enables the arm to provide a large working volume in comparison to arm volume.

Furtherstill, various components of the arm are modular, e.g., DC servo motors are used in all joints and a common design motor is used for the base, shoulder and extension drives. This feature allows for minimum spare part inventory and in addition enables the arm to be readily assembled and disassembled in sections to provide ready access to any portion of the arm for servicing, should such become necessary.

Without further elaboration, the foregoing will so fully illustrate our invention that others may, by applying current or future knowledge, readily adapt the same for use under various conditions of service.

We claim:

1. In a robotic system a manipulator for moving a device to a predetermined point within a working volume under control of microprocessor based control means comprising base joint means including a rotatable section, a first section extending from said rotatable joint means, said second link means being arranged to move into and out of said first link means and said third link means being arranged to move into and out of said second link means, said arm section including screw means and associated rope means for moving said second and third link means in unison, said screw means comprising an elongated screw secured to said first link means and cooperating nut means secured to said link means, said nut means being arranged to travel along said screw means to move said second link means with respect to said first link means, said rope means comprising at least one extension rope secured between said first link means and said third link means, one retraction rope secured between said first link means and said second link means, said second link means including first pull means arranged to be pulled by said extension rope and second pull means arranged to be pulled by said retraction rope.

26. The arm of claim 25 wherein said first pull means comprises a first pulley secured to said second link means and wherein said second pull means comprises a second pulley secured to said second link means.

27. The arm of claim 26 wherein each of said link means comprises a forward bulkhead and a rear bulkhead and wherein said extension rope is connected between the rear bulkhead of said first link means and the rear bulkhead of said third link means, said retraction rope is connected between the front bulkhead of said first link means and the rear bulkhead of said third link means, said first pulley is mounted on the front bulkhead of said second link means and said second pulley is mounted on the rear bulkhead of said second link means.

28. The arm of claim 25 additionally comprising first guide means for guiding the movement of said second link means with respect to said first link means and second guide means for guiding the movement of said third link means with respect to said second link means.

29. The arm of claim 28 wherein said first guide means is located within said first link means and comprises at least one elongated guide rail and wherein said second guide means is located within said second link means and comprises at least one elongated guide rail.

30. The arm of claim 29 wherein said second link is mounted on the guide rail of said first guide means by a bushing and wherein the third link means is mounted on the guide rail of the second guide means by a bushing.

* * * * * section and being fixed against rotation relative thereto, shoulder joint means, a second section extending along an extension axis from said shoulder joint means and wrist joint means mounted adjacent an end of said second section for supporting said device thereon, said wrist joint means comprising pitch joint means and roll joint means, said rotatable section of said base joint means being arranged to pivot said first section through a first predetermined arc about a first axis, said shoulder joint means being arranged to pivot said second section through a second predetermined arc about a second axis, said second axis intersecting said first axis perpendicularly at a first point at all positions of said device within said working volume, said pitch joint means being arranged to pivot said device through a third predetermined arc about a third axis, said roll joint means being arranged to pivot said device through a fourth predetermined arc about a fourth axis, said fourth axis intersecting said third axis perpendicularly at a second point, said third axis and said second axis being disposed parallel to each other, said first and second points lying along said extension axis.

2. The manipulator of claim 1 wherein said second section comprises a linearly extensible joint.

3. The manipulator of claim 2 wherein said linearly extensible joint comprises plural link means.

4. The manipulator of claim 3 wherein said link means are telescopeable.

5. The manipulator of claim 4 wherein said link means comprise a first link means secured to said shoulder joint means, a second link means arranged to move into and out of said first link means and a third link means arranged to move into and out of said second link means, said wrist joint means being mounted on said third link means.

6. The manipulator of claim 5 additionally comprising means for moving said second and third link means in unison.

7. The manipulator of claim 6 wherein said last-mentioned means for moving comprises screw means and associated rope means.

8. The manipulator of claim 7 wherein said screw means comprises an elongated screw secured to said first link means and cooperating nut means secured to said second link means, said nut means being arranged to travel along said screw means to move said second link means with respect to said first link means.

9. The manipulator of claim 8 wherein said rope means comprise at least one extension rope secured between said first link means and said third link means and one retraction rope secured between said first link means and said second link means, said second link means including first pull means arranged to be pulled by said extension rope and second pull means arranged to be pulled by said retraction rope.

10. The manipulator of claim 9 wherein said first pull means comprises a first pulley secured to said second link means and wherein said second pull means comprises a second pulley secured to said second link means.

11. The manipulator of claim 10 wherein each of said link means comprises a forward bulkhead and a rear bulkhead and wherein said extension rope is connected between the rear bulkhead of said first link means and the rear bulkhead of said third link means, said retraction rope is connected between the front bulkhead of said first link means and the rear bulkhead of said third link means, said first pulley is mounted on the front bulkhead of said second link means and said second pulley is mounted on the rear bulkhead of said second link means.

12. The manipulator of claim 5 comprises first guide means for guiding the movement of said second link means with respect to said first link means and second guide means for guiding the movement of said third link means with respect to said second link means.

13. The manipulator of claim 12 wherein said first guide means is located within said first link means and comprises at least one elongated guide rail and wherein said second guide means is located within said second link means and comprises at least one elongated guide rail.

14. The manipulator of claim 13 wherein said second link means is mounted on the guide rail of said first guide means by a bushing and wherein the third link means is mounted on the guide rail of the second guide means by a bushing.

15. The manipulator of claim 1 wherein the maximum first predetermined arc is approximately 355°, the maximum second predetermined arc is approximately 300°, the maximum third predetermined arc is approximately 210° and the maximum fourth predetermined arc is approximately 355°.

16. The manipulator of claim 1 wherein said base joint means, shoulder joint means and wrist roll joint means each comprises motor means and harmonic drive means.

17. The manipulator of claim 16 wherein each of said joint means can be readily disconnected from the remaining portion of the manipulator.

18. The manipulator of claim 1, further comprising electronically controlled motor means and coupling means for effecting movement of said joints, wherein said motor means comprises a plurality of motors, each coupled by associated coupling means to a respective one of said joints.

19. The manipulator of claim 18, wherein each of said motors is located generally adjacent the particular joint whose movement is effected by that motor, thus reducing the complexity of the coupling means and enabling the arm to produce highly accurate movements.

20. The manipulator of claim 19, wherein said motor means comprises plural electric motors.

21. The manipulator of claim 1, wherein a substantial portion of said first section is off-set from said first axis.

22. The manipulator of claim 21, wherein said first section is generally "L-shaped" so as to achieve said off-set.

23. The manipulator of claim 21, wherein said first section comprises interconnected first and second leg members which are substantially parallel but not colinear, with said first and second axes, respectively.

24. The manipulator of claim 1, wherein each of said joints is controlled independently of every other joint.

25. In a robotic system a manipulator arm for moving a device to a position in space comprising first joint means, an arm section mounted on said first joint means for rotation through a predetermined arc about a first axis and second joint means mounted on said arm section at a spaced location from said first joint means, said second joint means being arranged to support said device thereon, said arm section comprising first, second and third link means telescopically interconnected, whereupon said second joint means can be positioned at various predetermined distances from said first joint means, said first link means being secured to said first

UNITED STATES PATENT AND TRADEMARK OFFICE
CERTIFICATE OF CORRECTION

PATENT NO. : 4,547,119

DATED : October 15, 1985

INVENTOR(S) : Peter E. Chance and Mitchell Weiss

It is certified that error appears in the above-identified patent and that said Letters Patent is hereby corrected as shown below:

The title page should be deleted to appear as per attached title page.

Signed and Sealed this

Twenty-eighth Day of January 1986

[SEAL]

Attest:

DONALD J. QUIGG

*Attesting Officer*     *Commissioner of Patents and Trademarks*

United States Patent [19]

Chance et al.

[11] Patent Number: 4,547,119
[45] Date of Patent: Oct. 15, 1985

[54] ROBOTIC MANIPULATOR ARM

[75] Inventors: Peter E. Chance, Rosemont; Mitchell Weiss, Ardmore, both of Pa.

[73] Assignee: United States Robots, Inc., King of Prussia, Pa.

[21] Appl. No.: 567,136

[22] Filed: Dec. 30, 1983

Related U.S. Application Data

[63] Continuation of Ser. No. 314,156, Oct. 23, 1981, abandoned.

[51] Int. Cl.$^4$ .............................................. B25J 9/00
[52] U.S. Cl. .................................... 414/735; 901/18; 901/21; 414/718; 414/690
[58] Field of Search .................. 414/4, 5, 7, 690, 718, 414/728, 730, 735, 744; 901/14, 15, 17, 18, 21, 23, 24, 28, 29

[56] References Cited

U.S. PATENT DOCUMENTS

| | | | |
|---|---|---|---|
| 2,933,210 | 4/1960 | Dye | 414/728 X |
| 3,043,448 | 7/1962 | Melton | 901/14 X |
| 3,087,636 | 4/1963 | Weaver | 414/718 |
| 3,836,025 | 9/1974 | Olson et al. | 414/718 X |
| 3,960,285 | 6/1976 | Gano | 414/718 |
| 4,312,622 | 1/1982 | Favareto | 414/730 |

FOREIGN PATENT DOCUMENTS

| | | | |
|---|---|---|---|
| 2630858 | 1/1978 | Fed. Rep. of Germany | 901/21 X |
| 1393349 | 5/1975 | United Kingdom | 901/18 X |
| 2045720 | 11/1980 | United Kingdom | 901/18 X |
| 334777 | 5/1980 | U.S.S.R. | 901/18 X |

OTHER PUBLICATIONS

1982 Robotics Industry Directory, "Maker I Robot System", p. 128.

Primary Examiner—Terrance L. Siemens
Attorney, Agent, or Firm—Caesar, Rivise, Bernstein & Cohen, Ltd.

[57] ABSTRACT

A robotic system including a manipulator arm for moving a device to a predetermined point within a working volume under control of microprocessor based control unit. The manipulator arm includes various sections and joints defining a base, a shoulder, an arm and a wrist. The wrist is jointed to pivot about a pitch axis and a roll axis. The manipulator is arranged to pivot the arm about the base axis and shoulder axis, which axes intersect at a common point. The arm includes a section which is extendable through the use of telescoping links. The wrist is mounted on the end of the telescoping links, with the pitch and roll axes intersecting at a second point. The second point lies along the extension axis of the arm links and is spaced from the shoulder-base axis intersection point. The links forming the telescoping section are arranged to move in unison with each other. A motor and associated harmonic drives are provided to effect the motion at the joints.

30 Claims, 14 Drawing Figures